US007275057B2

(12) United States Patent
Imanishi et al.

(10) Patent No.: US 7,275,057 B2
(45) Date of Patent: Sep. 25, 2007

(54) METHOD FOR REDUCING COMMUNICATION DATA AMOUNT IN BUSINESS TO BUSINESS ELECTRONIC COMMERCE

(75) Inventors: Junichi Imanishi, Yokohama (JP); Hiroshi Koike, Maebashi (JP); Nobuo Beniyama, Kawasaki (JP); Takeshi Arisaka, Kawasaki (JP); Mitsuteru Omata, Zama (JP)

(73) Assignee: Hitachi, Ltd., Tokyo (JP)

( * ) Notice: Subject to any disclaimer, the term of this patent is extended or adjusted under 35 U.S.C. 154(b) by 427 days.

(21) Appl. No.: 10/348,708

(22) Filed: Jan. 22, 2003

(65) Prior Publication Data

US 2003/0208526 A1 Nov. 6, 2003

(30) Foreign Application Priority Data

Apr. 16, 2002 (JP) ............................. 2002-112818

(51) Int. Cl.
 *G06F 17/30* (2006.01)
(52) U.S. Cl. ............................. 707/6; 707/10; 707/203
(58) Field of Classification Search ........ 707/200–205, 707/104.1
See application file for complete search history.

(56) References Cited

U.S. PATENT DOCUMENTS 5,767,847 A * 6/1998 Mori et al. ................. 715/733
5,826,017 A * 10/1998 Holzmann ................... 709/230
6,321,283 B1 * 11/2001 Ventura ...................... 710/107
6,442,569 B1 * 8/2002 Crapo et al. ................ 707/201
6,496,504 B1 * 12/2002 Malik ......................... 370/390
6,516,328 B1 * 2/2003 Mori et al. .................. 715/500
6,625,622 B1 * 9/2003 Henrickson et al. ........ 707/204
6,690,678 B1 * 2/2004 Basso et al. ................ 370/468
6,711,624 B1 * 3/2004 Narurkar et al. ............ 719/321
6,757,696 B2 * 6/2004 Multer et al. ............... 707/201
6,910,048 B1 * 6/2005 Misheski et al. ....... 707/103 R
2002/0029227 A1 * 3/2002 Multer et al. ............... 707/203
2004/0059738 A1 * 3/2004 Tarbell ........................ 707/100
2004/0122865 A1 * 6/2004 Stahl et al. ............. 707/104.1
2005/0114285 A1 * 5/2005 Cincotta ......................... 707/1

FOREIGN PATENT DOCUMENTS

| JP | 04-352538 | 12/1992 |
| JP | 08-161395 | 6/1996 |
| JP | 2001-014194 | 1/2001 |

* cited by examiner

*Primary Examiner*—Debbie Le
(74) *Attorney, Agent, or Firm*—Hogan & Hartson LLP

(57) ABSTRACT

A Business to Business electronic commerce (BtoB) system includes a message exchanging section, a task processing section and that conforms to BtoB standard specifications, and a difference processing section is added. For an outgoing business document, the difference processing section creates difference information between a past transaction and a new transaction within the range of the BtoB standard message format and sends the message to a business counterpart. For an incoming business document, the difference processing section restores a new transaction based on a past transaction and difference information.

17 Claims, 15 Drawing Sheets

Fig. 16

| Business counterpart Identifier | Document Structure Definition | Template Identifier | Exchange Flag |
|---|---|---|---|
| A company | Order.dtd | OrderA.xml | O |
| A company | Cancel.dtd | CancelA.xml | O |
| B company | Order.dtd | OrderB.xml | X |
| B company | Cancel.dtd | CancelB.xml | X |
| C company | Order.dtd | OrderC.xml | X |

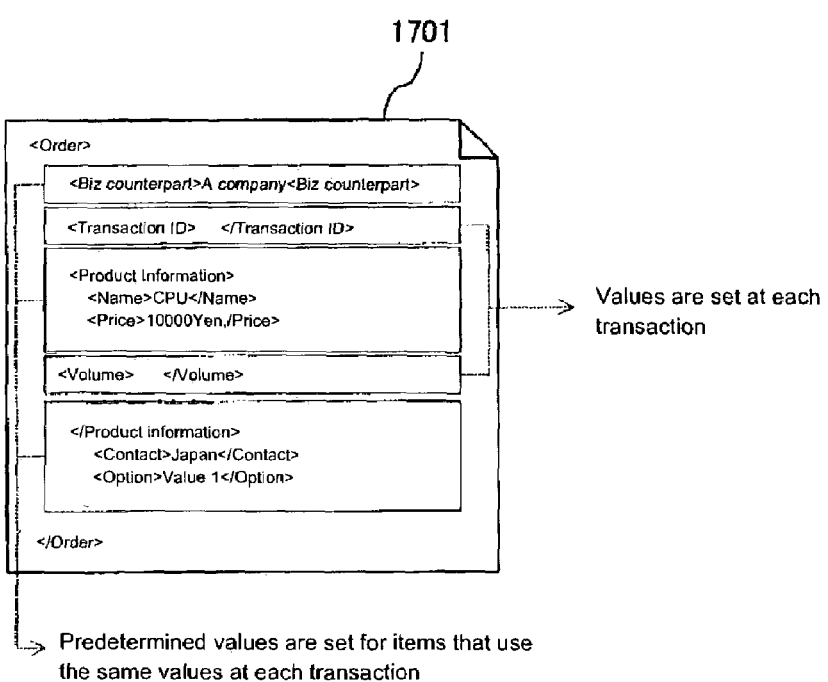

1701

```
<Order>
    <Biz counterpart>A company<Biz counterpart>
    <Transaction ID>    </Transaction ID>
    <Product Information>
        <Name>CPU</Name>
        <Price>10000Yen,/Price>
    <Volume>    </Volume>
    </Product information>
        <Contact>Japan</Contact>
        <Option>Value 1</Option>
</Order>
```

→ Values are set at each transaction

→ Predetermined values are set for items that use the same values at each transaction

METHOD FOR REDUCING COMMUNICATION DATA AMOUNT IN BUSINESS TO BUSINESS ELECTRONIC COMMERCE

BACKGROUND OF THE INVENTION

1. Field of the Invention

The present invention relates to an electronic commerce between enterprises using a network such as the Internet (i.e., Business to Business electronic commerce (BtoB)) and its system, in which business documents are exchanged between at least two computers connected via a communication network. More particularly, the present invention relates to methods for reducing communication data amount in exchanging business documents.

2. Related Background Art

In recent years, with the spread of the Internet and the establishment of standard data exchange technologies such as XML, Business to Business electronic commerce (BtoB) in open communication network environments have begun to take place. With this, standard specifications for information processing technology have been drawn up to transfer electronic business documents between corporations doing business in BtoB.

In such standard specifications, rules concerning formats of electronic business documents exchanged between corporations and rules concerning message formats (BtoB standard message formats) for outgoing business documents to business counterparts are set forth.

Among organizations that stipulate specific formats for BtoB standard messages is RosettaNet. RosettaNet sets forth rules concerning business document formats based on Partner Interface Processes. It sets forth rules concerning message formats for outgoing business documents based on RosettaNet Implementation Framework.

In conventional BtoB, corporations doing business with each other stipulate their own communication data formats, which means that a different electronic commerce system is required for each business counterpart. However, by having a single electronic commerce system that conforms to the BtoB standard specifications based on the standard specifications drawn up, a corporation can transact business with an indefinite number of corporations that also have an electronic commerce system that conforms to the BtoB standards.

In the standard specifications for BtoB, formats for business documents are strictly regulated. For example, data items that must be included in business documents are stipulated by the standard specifications. However, once certain corporations begin to do business based on BtoB, there could be many data items whose values remain the same in every transaction. For example, when a corporation periodically orders the same product to be delivered to the same location, changing only the volume every time, the same data for data items such as product name, product code and destination would be sent every time an order is placed.

Currently, the BtoB market is rapidly growing, and a boost in communication traffic in networks is expected. In such a situation, using the BtoB standard formats that entail high redundancy is inefficient. Further, the exchange of business documents in BtoB has high security requirements in terms of confidentiality, and encryption of business documents and use of electronic signatures through electronic encryption technology are often required.

Since electronic encryption processing entails high computing costs, using the BtoB standard formats with high redundancy can have a direct impact on processing loads of information processing systems, which can lead to a high cost for the systems.

Among technologies to reduce some communication data amount, a data compression technology is known. For example, a data compression method for XML documents has been proposed. However, when such communication data compression technology is applied unaltered to outgoing business documents and BtoB standard messages, the message formats that conform to BtoB standard specifications become corrupted, and document format check error occurs in a system that conforms to the BtoB standards.

On the other hand, when conducting an electronic commerce without using BtoB standard formats, corporations doing business with each other must stipulate their own message formats, and the resulting electronic commerce system would allow transactions only between certain corporations.

SUMMARY OF THE INVENTION

The present invention relates to methods to make possible business transactions with an indefinite number of business counterparts using a single electronic commerce system that conforms to BtoB standards, while also reducing the communication data amount in electronic commerce.

In accordance with an embodiment of the present invention, in a BtoB system that uses BtoB standard formats to exchange business documents between at least two computers connected via a communication network, a difference processing section is added to each computer comprising a task processing section and a message exchanging section. For an outgoing business document, the difference processing section creates, within the range of BtoB standard message formats, difference information between a business document sent in the past and a newly outgoing business document, depending on the business counterpart and/or nature of the transaction, and sends the difference information to the business counterpart. For an incoming business document, the difference processing section restores a newly received business document based on a business document received in the past and on difference information.

When existing data compression technologies are simply applied to business documents, the output is the data dependent on compression algorithm, which cannot be processed by existing BtoB systems. However, by using a difference creating method according to the present invention, redundant data can be reduced without corrupting the XML document structure of business documents that conform to BtoB standard specifications.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 16 shows an example of details of a template management DB.

FIG. 17 shows an example of a template configuration.

DESCRIPTION OF PREFERRED EMBODIMENTS

First, one example in which communication data amount is reduced by using business history information in accordance with an embodiment of the present invention will be described with reference to the accompanying drawings.

Figure 1:
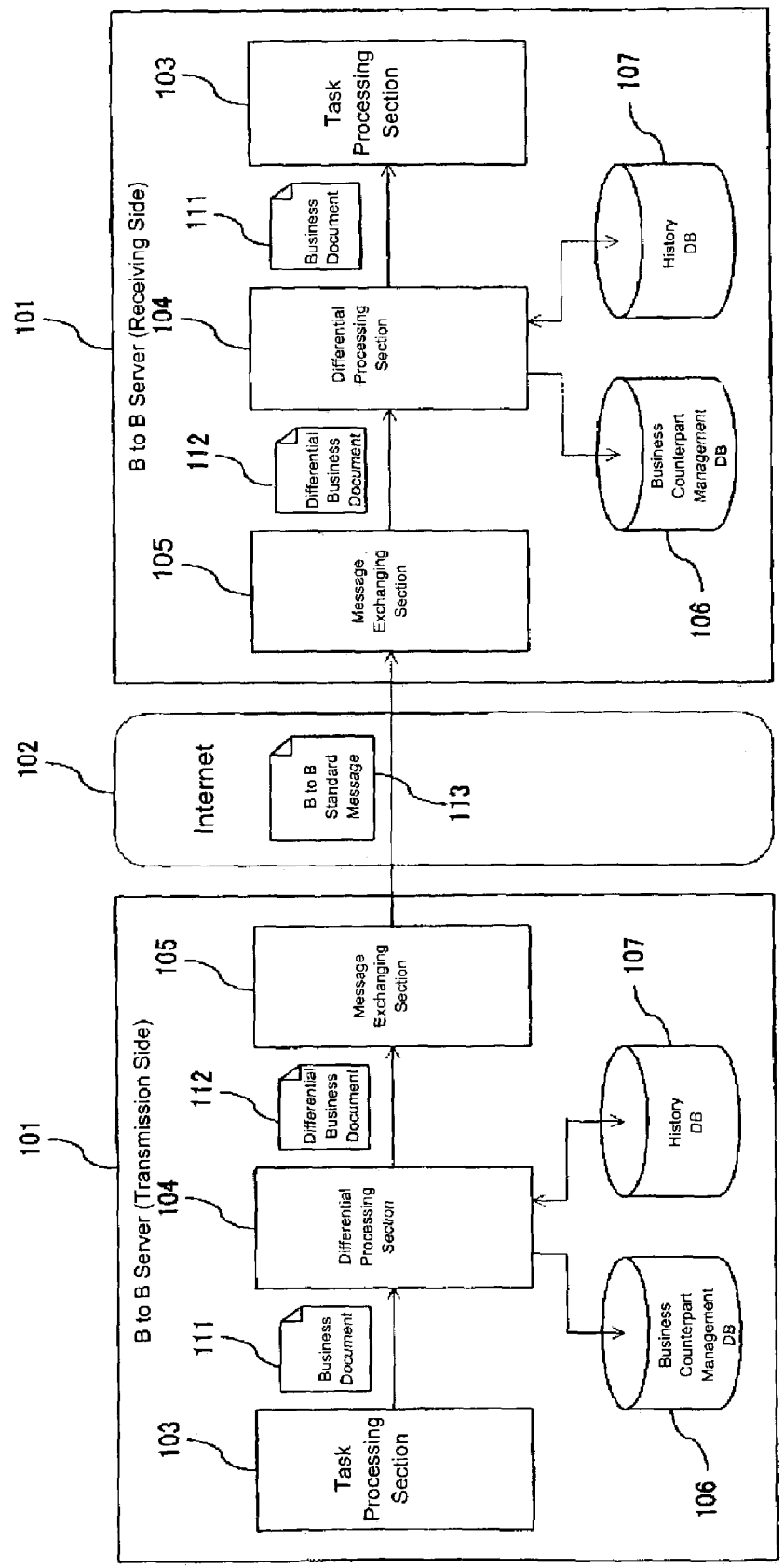
FIG. 1 shows a software configuration, as well as data that flow between modules, in accordance with an embodiment of the present invention.

FIG. 1 is an overall view of a BtoB system according to the present invention. Each BtoB server 101 on the transmission side and the receiving side consists of a task processing section 103, a difference processing section 104 and a message exchanging section 105, and each BtoB server 101 is connected via an Internet 102.

Each of the difference processing sections 104 can access a business counterpart management database (DB) 106 and a history DB 107. For an outgoing business document, task processing section 103 creates, depending on the task processing, a business document 111 to be sent to a business counterpart. For an incoming business document, each task processing section 103 performs appropriate task processing, depending on the content of the business document 111 received.

For an outgoing business document, difference processing section 104 receives the business document 111 from the task processing section 103, and creates a difference business document 112 based on the content and business counterpart of the business document 111 and on information in the history DB 107. For an incoming business document, the difference processing section 104 receives the difference business document 112 from the message exchanging section 105 and restores the business document 111 based on the difference business document 112, the business counterpart and information in the history DB 107.

For an outgoing business document, the message exchanging section 105 receives the difference business document 112, creates a BtoB standard message 113 that contains the difference business document 112, and sends it to the business counterpart. For an incoming business document, the message exchanging section 105 receives the BtoB standard message 113, checks the format of the BtoB standard message 113, and extracts the difference business document 112 contained in the BtoB standard message 113.

Figure 2:
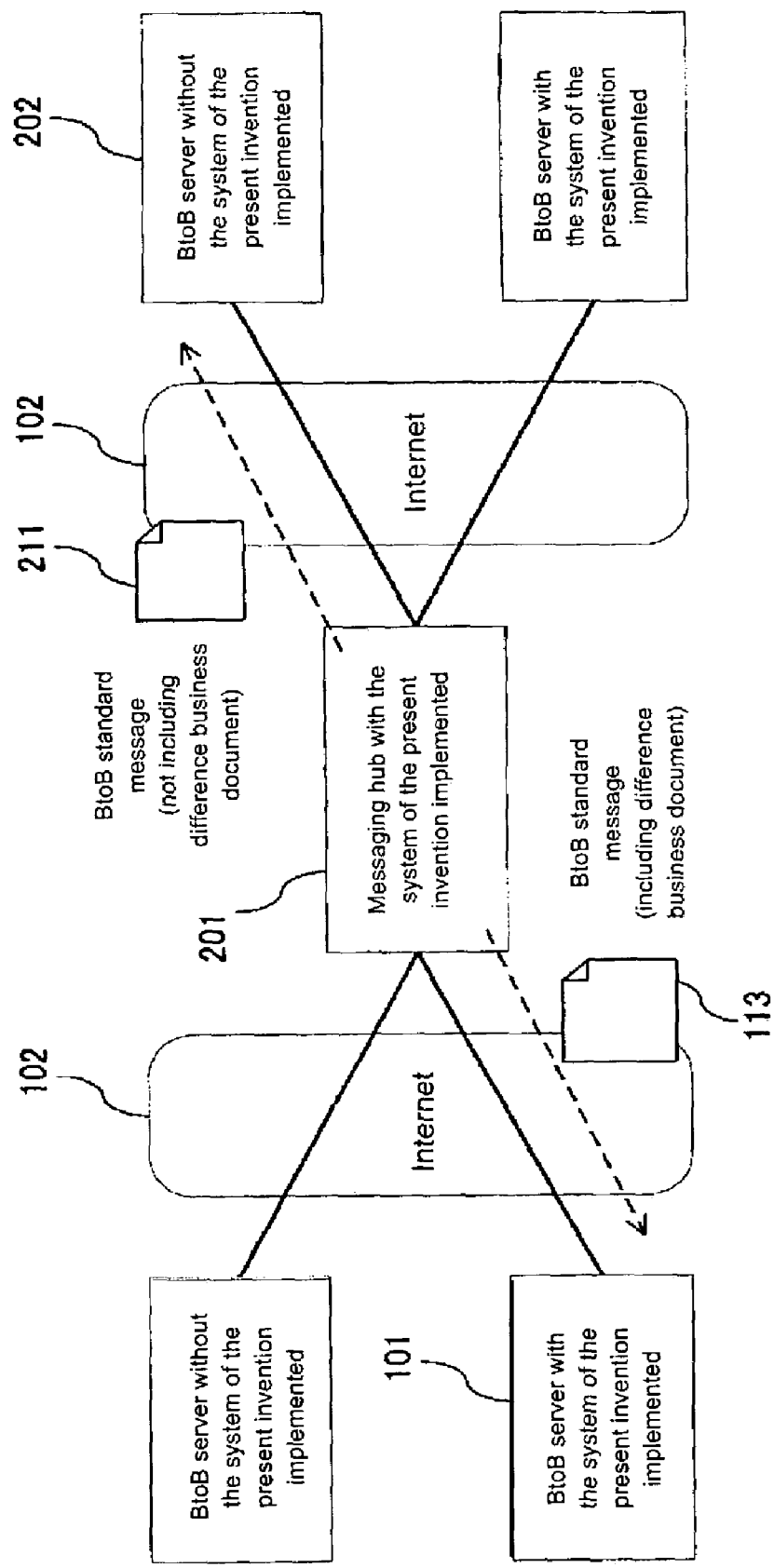
FIG. 2 shows an example in which the present invention is used in a network that uses a messaging hub.

FIG. 2 is an example of the present invention applied to a network that uses a messaging hub 201.

The BtoB server 101 that has the system according to the present invention installed and the messaging hub 201 communicate with each other using the BtoB standard message 113 in a difference format. The messaging hub 201 and a BtoB server 202 that does not have the system according to the present invention installed communicate with each other using a normal BtoB standard message 211. By using the messaging hub 201, the amount of communication data between the BtoB server 101 that has the system according to the present invention installed and the BtoB server 202 that does not have the system according to the present invention installed can be partly reduced.

An example of a network having a mode shown in FIG. 2 is an electronic marketplace.

Figure 3:
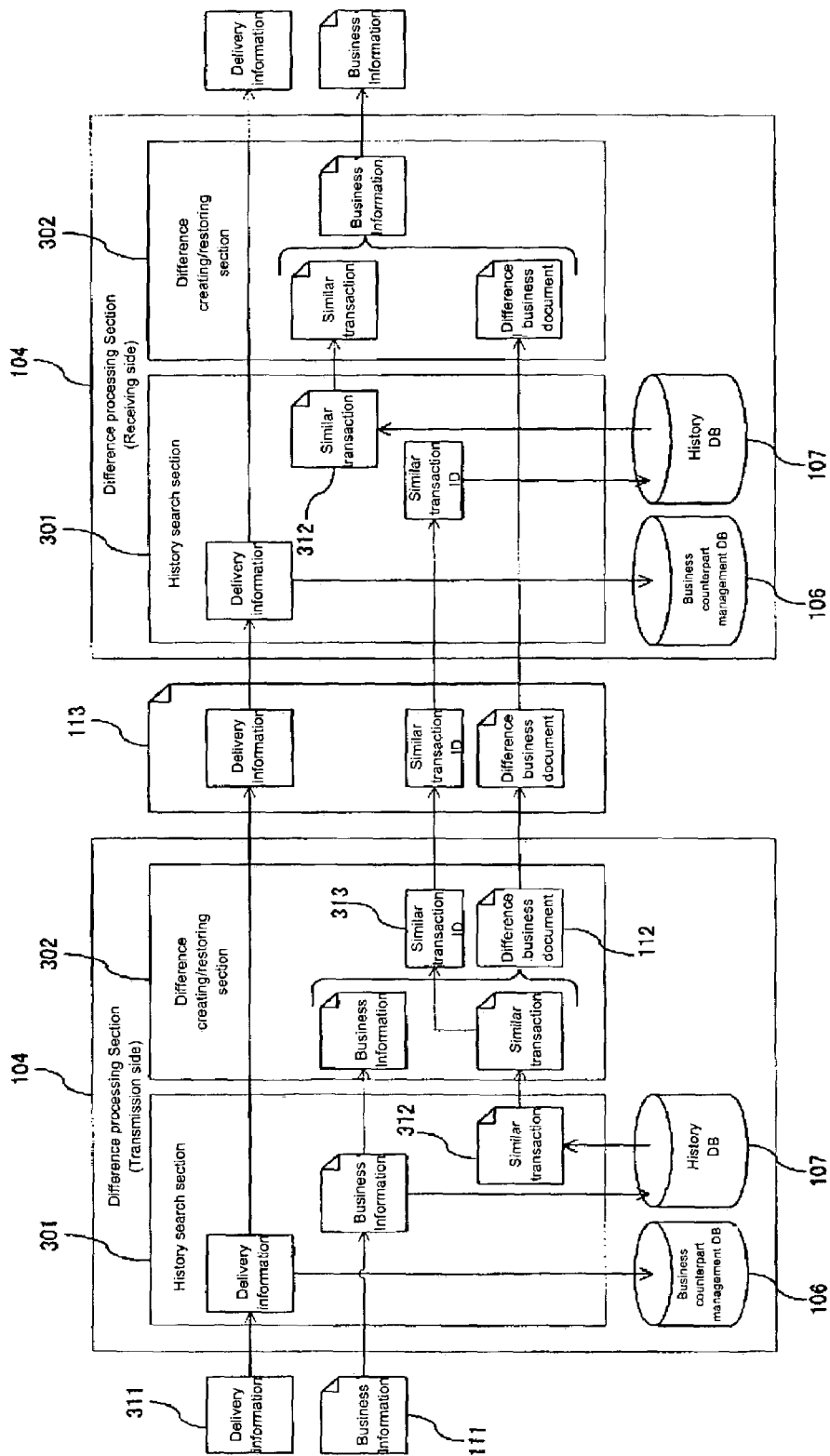
FIG. 3 shows modules within a difference processing section and the flow of data for outgoing and incoming business documents.

FIG. 3 shows an internal module configuration of each difference processing section 104 and flow of data in the system. The difference processing section 104 consists of a history searching section 301 and a difference creating/restoring section 302.

For an outgoing business document, the difference processing section 104 receives delivery information 311 and the business document 111 from the task processing section 103. The delivery information 311 contains a business counterpart identifier 1502. These pieces of information are first sent to the history searching section 301. Upon receiving the delivery information 311 and the business document 111, the history searching section 301 first obtains the business counterpart identifier 1502 from the delivery information 311 and searches the business counterpart management DB 106 to check whether the corresponding business counterpart's electronic commerce system has the system according to the present invention installed. Next, the history searching section 301 searches the history DB 107 and obtains a similar transaction 312, whose content is similar to that of the business document 111. The business document 111 and the similar transaction 312 are sent to the difference creating/restoring section 302.

The difference creating/restoring section 302 creates the difference business document 112 based on the business document 111 and the similar transaction 312, and obtains from the similar transaction 312 a similar transaction ID 313, which is an identifier of the similar transaction 312.

The delivery information 311, the difference business document 112 and the similar transaction ID 313 are sent to the message exchanging section 105, where they are incorporated into the BtoB standard message 113.

For an incoming business document, the difference processing section 104 receives the delivery information 311, which the message processing section 105 obtained from the BtoB standard message 113, the difference business document 112 and the similar transaction ID 313. These pieces of information are first sent to the history searching section 301.

The history searching section 301 obtains the business counterpart identifier 1502 from the delivery information 311 and searches the business counterpart management DB 106 to check whether the corresponding business counterpart's electronic commerce system has the system according to the present invention installed. Next, the history searching section 301 checks whether the BtoB standard message 113 received contains the difference business document 112, searches the history DB 107 using the similar transaction ID 313 as the keyword, and obtains the similar transaction 312. The similar transaction 312 and the difference business document 112 are sent to the difference creating/restoring section 302.

The difference creating/restoring section 302 restores the business document 111 based on the similar transaction 312 and the difference business document 112. The restored business document 111 and the delivery information 311 are sent to the task processing section 103.

Figure 14:
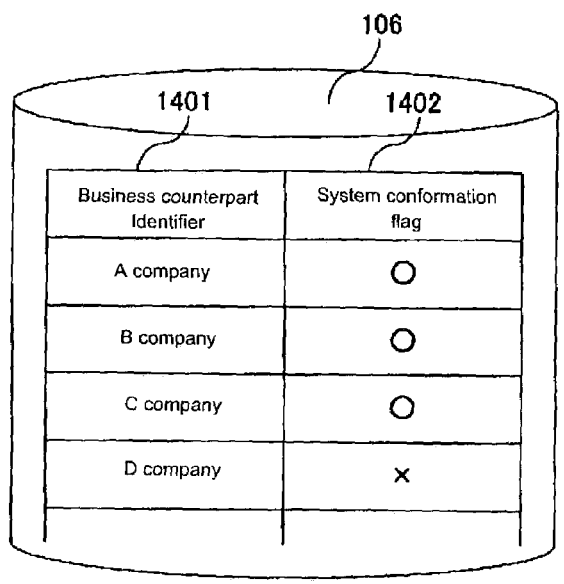
FIG. 14 shows an example of details of a business counterpart management DB.

FIG. 14 shows the details of the business counterpart management DB 106. Each business counterpart identifier 1401 is an identifier that uniquely identifies a particular business counterpart throughout the system. Each system conformation flag 1402 is a flag that shows whether the electronic commerce system of the business counterpart indicated by the corresponding business counterpart identifier 1401 has the system according to the present invention installed.

Figure 15:
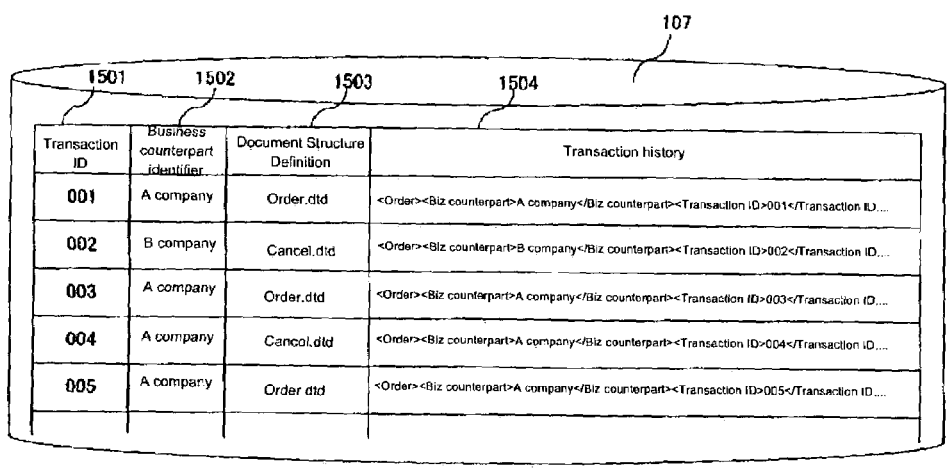
FIG. 15 shows an example of details of a history DB.

FIG. 15 shows the details of the history DB 107. Each transaction ID 1501 is an identifier for a transaction. Each business counterpart identifier 1502 is an identifier for a business counterpart. Each document structure definition 1503 is a format of the document to be followed for the corresponding transaction. The column for the document structure definition 1503 shows DTD filenames. Each transaction history 1504 is actual data of business documents for past transactions.

Figure 4:
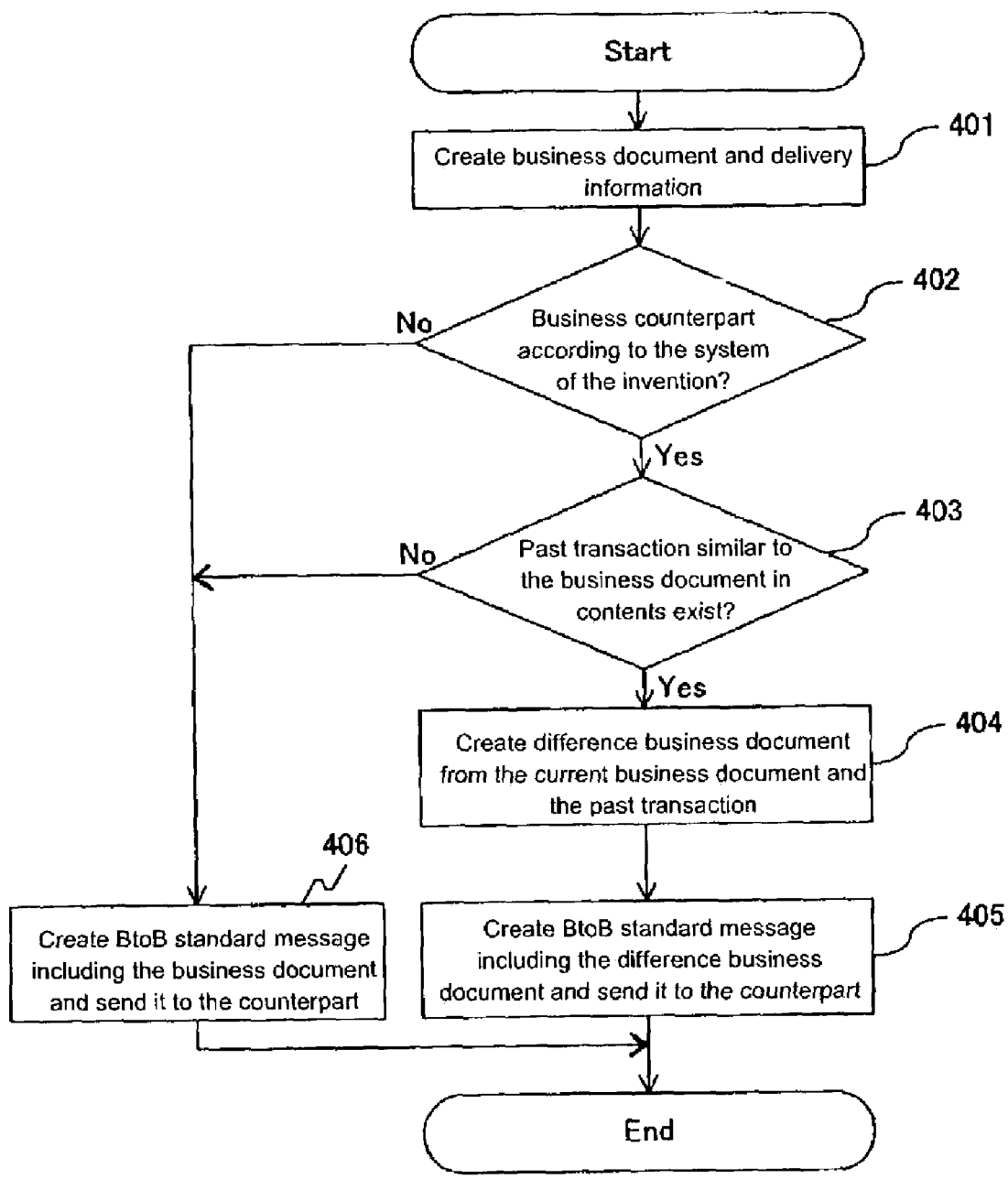
FIG. 4 shows a flowchart of a processing that takes place in a difference processing section for outgoing business documents.

FIG. 4 is a flowchart of a processing that takes place in the BtoB server 101 when sending a business document.

The business document 111 and the delivery information 311 are created (step 401). Based on the business counterpart identifier 1502 contained in the delivery information 311, the business counterpart management DB 106 is searched to check whether the electronic commerce system of the corresponding business counterpart has the system according to the present invention installed (step 402). If the business counterpart's electronic commerce system has the system according to the present invention installed, the processing proceeds to step 403; if not, the processing proceeds to step 406. The similar transaction 312 from the past whose content is similar to that of the business document 111 is searched for in the history DB 107 (step 403). The details of the searching method are described later. If the similar transaction 312 exists, the processing proceeds to step 404; if not, the processing proceeds to step 406. The difference business document 112 is created based on the business document 111 to be sent and the similar transaction 312 from the past (step 404). The details of how to create the difference business document 112 are described later. The BtoB standard message 113 that contains the difference business document 112 is created and sent to the business counterpart (step 405). The BtoB standard message 211 that contains the business document 111 is created and sent to the business counterpart (step 406).

Next, the details of how to search for the similar transaction 312 in step 403 in FIG. 4 are described.

First, a past transaction whose business counterpart identifier 1502 and the document structure definition 1503 are the same as those of the newly outgoing business document 111 is searched for in the history DB 107. Next, the degree of similarity with the newly outgoing business document 111 is calculated for every transaction obtained as a result of the search. The calculation method for the degree of similarity is described later. After calculating the degrees of similarity, a past transaction whose degree of similarity is highest is searched. If the highest degree of similarity exceeds a predetermined value, the corresponding past transaction becomes the similar transaction 312. If the highest degree of similarity does not exceed the predetermined value, it is judged that the similar transaction 312 does not exist.

Figure 6:
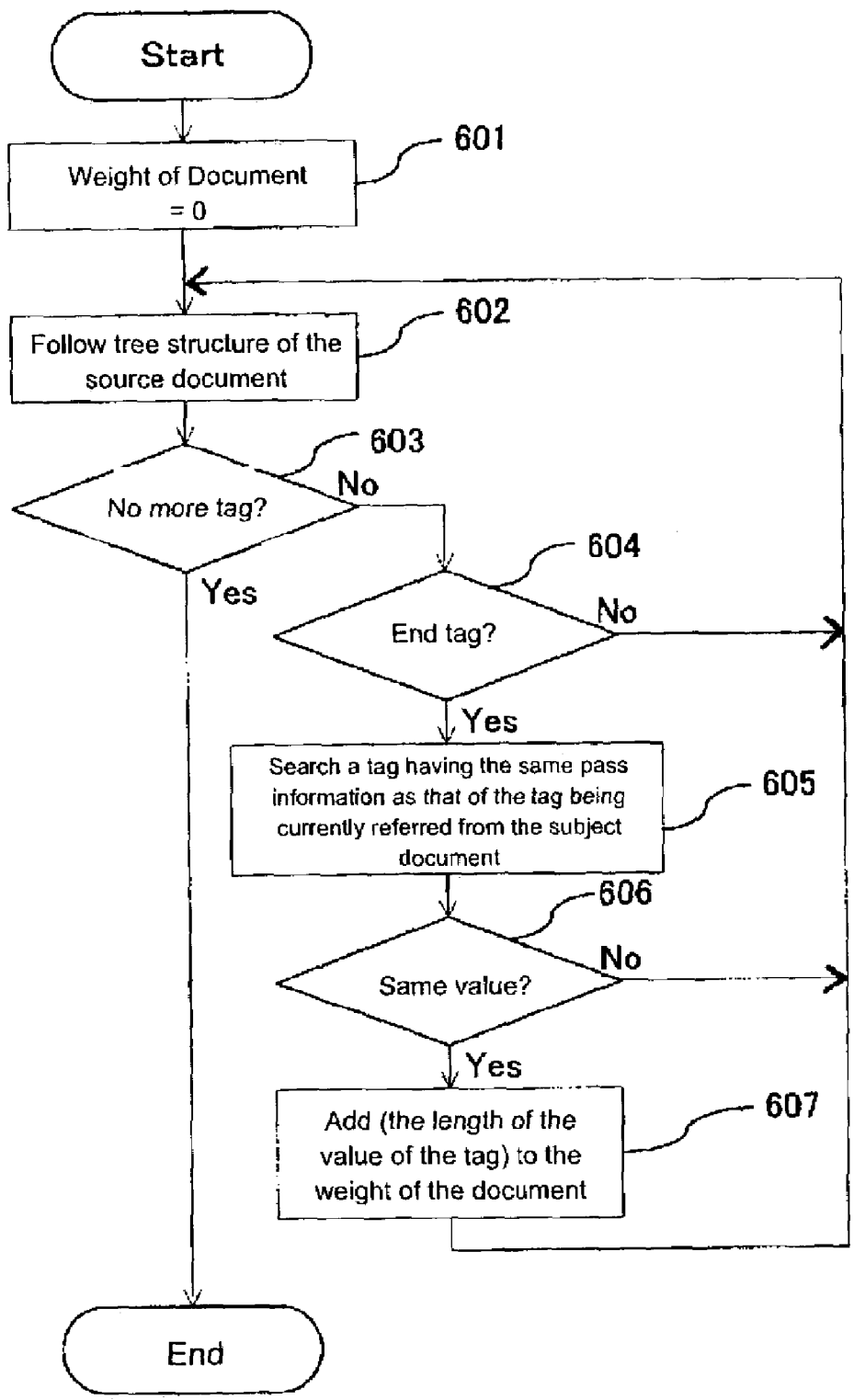
FIG. 6 shows an algorithm for calculating the degree of similarity between an outgoing business document and a past transaction.

Next, referring to FIG. 6, a description is made as to the calculation method for the degree of similarity between a past transaction and the newly outgoing business document 111. Here, the original document is either the past transaction or the newly outgoing business document 111. The subject document is the newly outgoing business document 111 if the original document is the past transaction, and it is the past transaction if the original document is the newly outgoing business document 111.

Zero (0) is assigned as the weight of a document (step 601). Nodes in a tree structure with tags for the original document developed are followed (step 602). If there are more tags that can be followed, the processing proceeds to step 604 (step 603). If there are no more tags that can be followed, the current document weight becomes the degree of similarity and the processing ends. If the tag at the current position is an end tag without any subtags, the processing proceeds to step 605 (step 604). If not, the processing proceeds to step 602. A tag that has the same path information as the tag at the current position is searched for among subject document tags (step 605). The details concerning path information are described later. If the value of the tag at the current position and the value of the tag found in step 605 match, the processing proceeds to step 607 (step 606). If the tag values do not match, or if there is no tag found in step 605, the processing proceeds to step 602. The length of the value of the tag at the current position is added to the document weight (step 607).

The above describes the calculation method for the degree of similarity between a past transaction and the newly outgoing business document 111. In this calculation method for the degree of similarity, situations in which a tag is essential in terms of document definition and situations in which a tag can be omitted are treated similarly. If the value of a tag that can be omitted matches the value of a tag in the subject document, more excess data can be reduced by omitting the tag. When a tags is omitted to begin with, a specific symbol is written in the difference business document 112 to represent the tag value, so that the receiving side can distinguish a case when the tag was omitted because the values matched from a case when the tag was omitted to begin with in the incoming business document.

Figure 7:
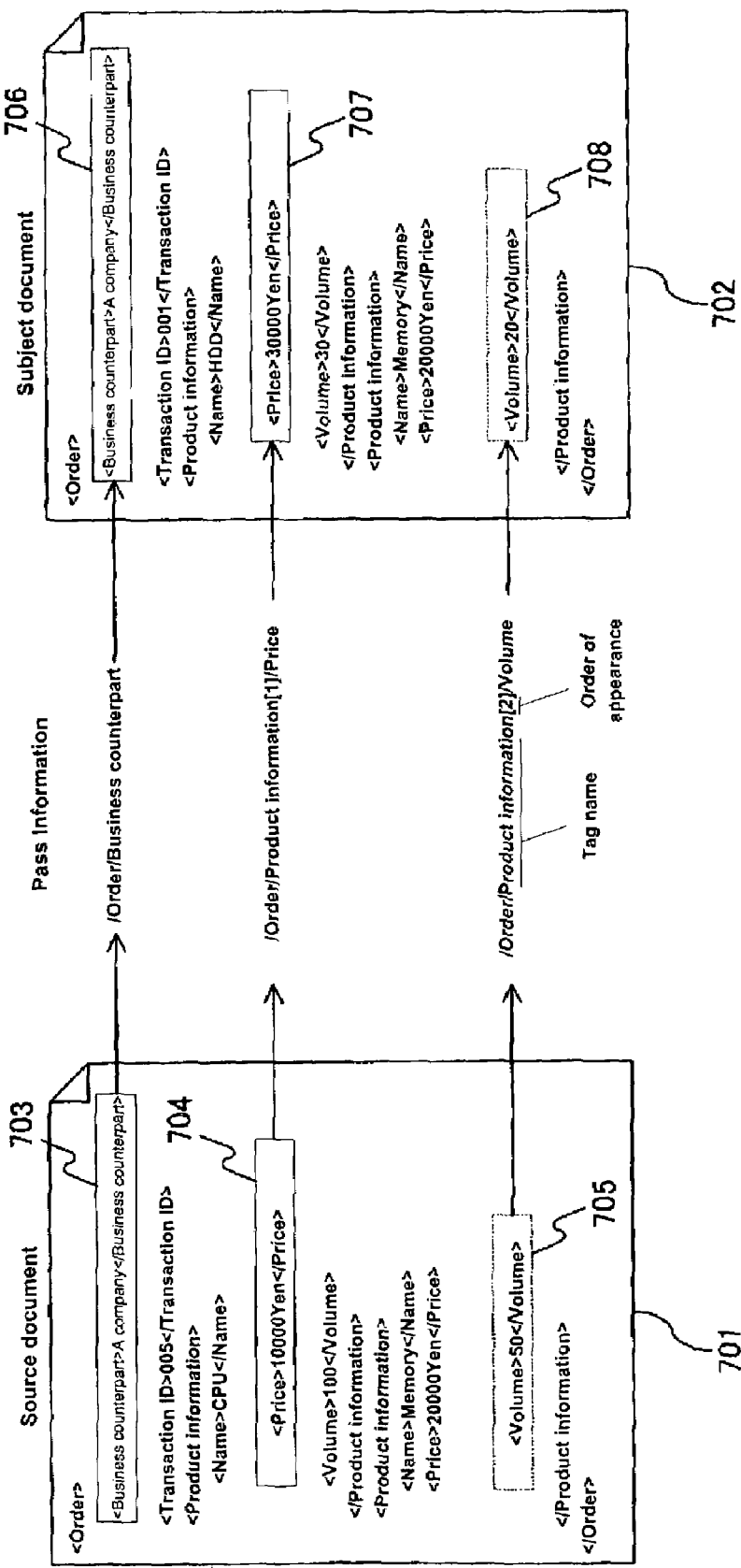
FIG. 7 shows a correlation between path information of tags in two business documents.

FIG. 7 indicates how to correlate path information in step 605 in FIG. 6.

Path information is tag names separated by delimiters and arranged in the order the tags are followed from the top of a tree structure. If there is a plurality of tags having the same name as subtags under one tag, the order of appearance is added at the end of each tag name. If the delimiter is "forward slash" (/), the path information for a tag 703 and a tag 706 is "/order/business counterpart." The path information for a tag 704 and a tag 707 is "/order/product information [1]/price"; and the path information for a tag 705 and a tag 708 is "/order/product information [2]/volume." Tag names without any order of appearance are deemed to be equivalent to tag names whose order of appearance is 1. Consequently, "/order/product information" and "/order/product information [1]" are the same path information.

Figure 8:
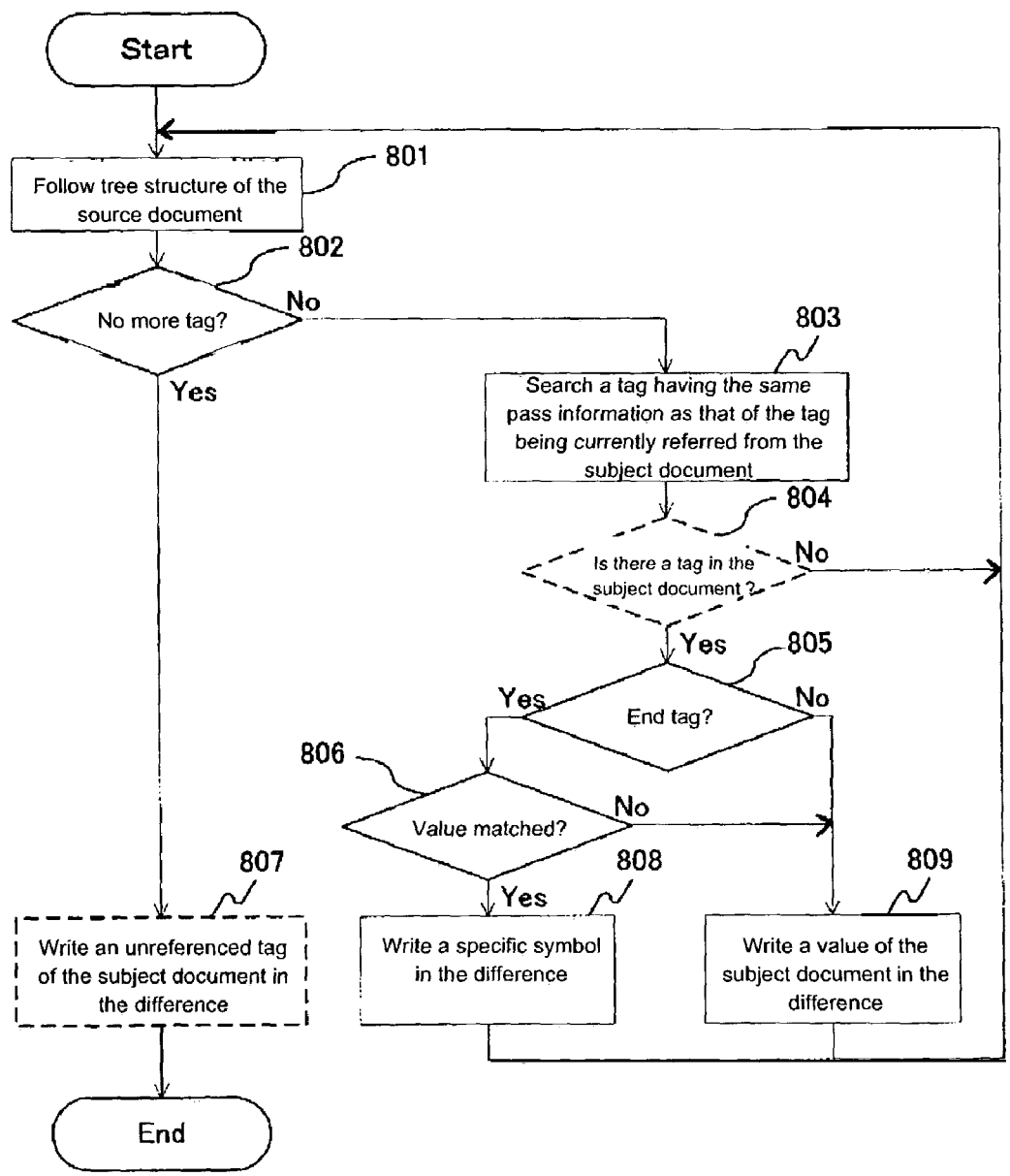
FIG. 8 shows an algorithm for creating a difference business document based on an outgoing business document and a similar transaction.

Next, FIG. 8 indicates the details of how to create the difference business document 112 in step 404 in FIG. 4. The original document is either the similar transaction 312 or the business document 111. If the original document is the similar transaction 312, the subject document is the business document 111. If the original document is the business document 111, the subject document is the similar transaction 312. If the original document is the business document 111, steps 804 and 807 are skipped without any processing, and in such cases the processing that follows step 803 is always step 805.

Nodes in a tree structure with tags of the original document developed are followed (step 801). If there are more tags that can be followed, the processing proceeds to step 803; if there are no more tags that can be followed, the processing proceeds to step 807 (step 802). A tag with the same path information as the tag at the current position is searched for among subject document tags (step 803). If there is a tag in the subject document with the same path information as the tag at the current position, the processing proceeds to step 805; if not, the processing proceeds to step 801 (step 804). If the tag at the current position is an end tag without any subtags, the processing proceeds to step 806; if not, the processing proceeds to step 809 (step 805). If the value of the tag at the current position and the value of the tag found in step 803 match, the processing proceeds to step 808; if not, the processing proceeds to step 809 (step 806). All names and values of tags that are unreferenced among tags in the subject document are written in the difference business document 112 (step 807). The value of the tag at the current position replaced by a specific symbol is written in the difference business document 112 (step 808). The tag value in the difference business document 112 is replaced by the specific symbol. The specific symbol is a replacement value with a small number of characters to reduce the amount of information in a tag value with a large number of characters. The name and value of the tag at the current position are written in the difference business document 112 (step 809).

Figure 5:
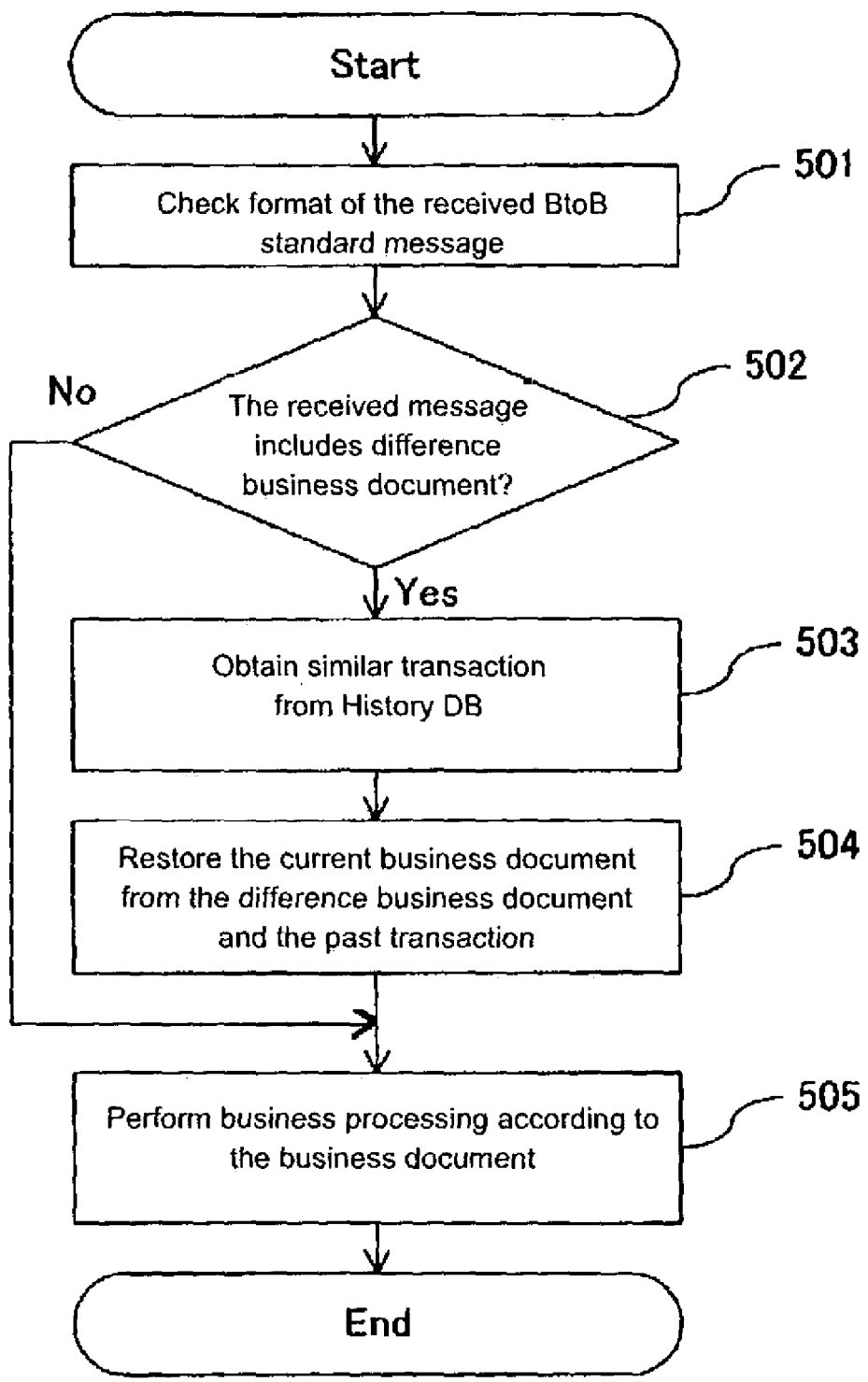
FIG. 5 shows a flowchart of a processing that takes place in a difference processing section for incoming business documents.

FIG. 5 is a flowchart of processing that takes place in the BtoB server 101 when receiving a business document.

A format check is done to check whether the format of the BtoB standard message 113 received conforms to the BtoB standard specifications (step 501). Whether the BtoB standard message 113 received contains the difference business document 112 is checked by the presence or lack of the similar transaction ID 313 (step 502). If the difference business document 112 is contained, the processing proceeds to step 503; if not, the processing ends. The history DB 107 is searched using the similar transaction ID 313 as the keyword and the similar transaction 312 is obtained (step 503). The original business document 111 is restored based on the difference business document 112 and the past similar transaction 312 (step 504). The details of how to restore the business document 111 are described later. A task processing that corresponds to the nature of the business document 111 is performed (step 505).

Figure 9:
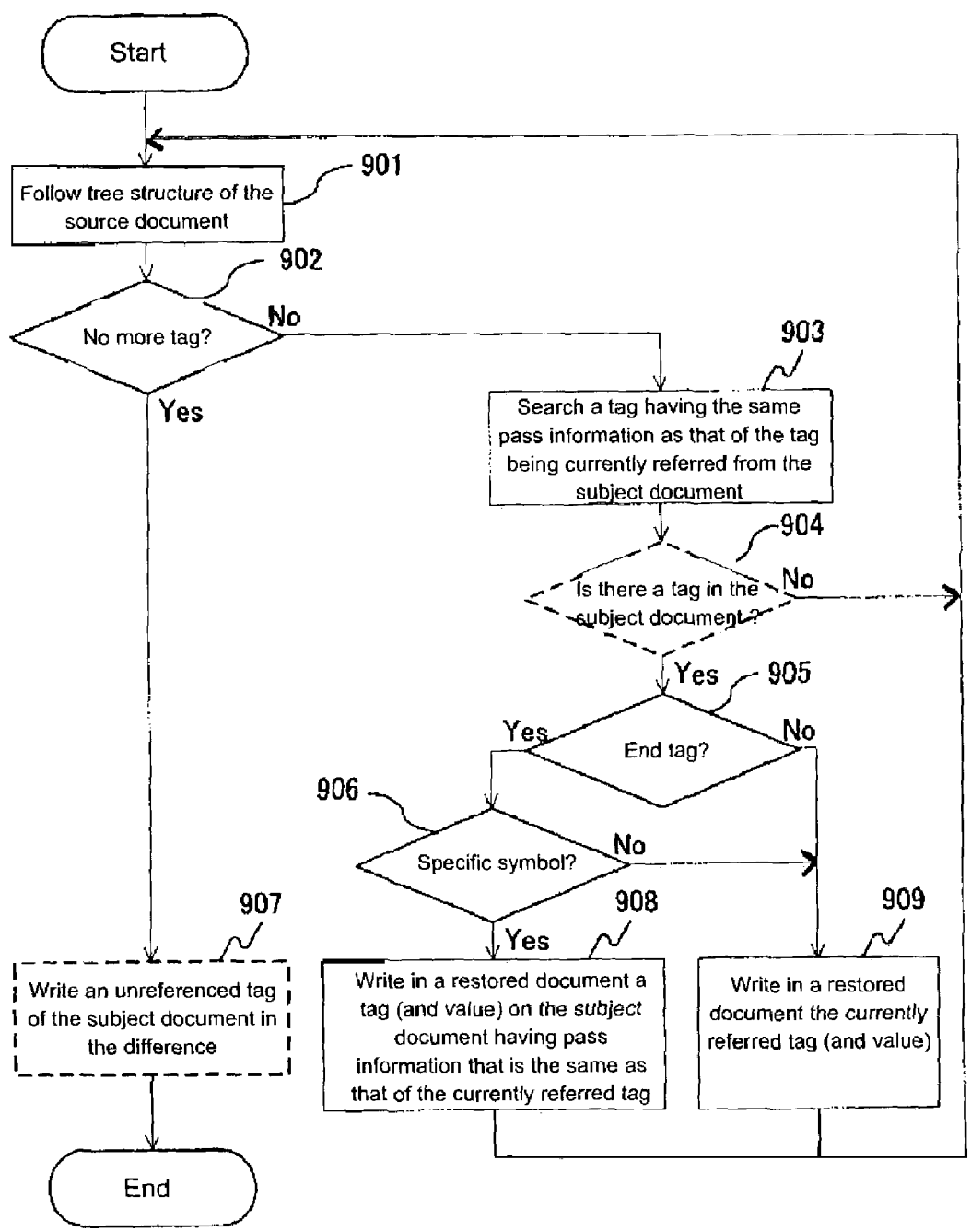
FIG. 9 shows an algorithm for restoring an original business document based on an incoming difference business document and a similar transaction.

Next, FIG. 9 indicates the details of how to restore the business document 111 in step 504 in FIG. 5. The original document is either the similar transaction 312 or the difference business document 112. If the original document is the similar transaction 312, the subject document is the difference business document 112. If the original document is the difference business document 112, the subject document is the similar transaction 312. If the original document is the difference business document 112, steps 904 and 907 are skipped without any processing. In such cases, the processing that follows step 903 is always step 905.

Nodes in a tree structure with tags of the original document developed are followed (step 901). If there are more tags that can be followed, the processing proceeds to step 903; if there are no more tags that can be followed, the processing proceeds to step 907 (step 902). A tag with the same path information as the tag at the current position is searched for among subject document tags (step 903). If there is a tag in the subject document with the same path information as the tag at the current position, the processing proceeds to step 905; if not, the processing proceeds to step 901 (step 904). If the tag at the current position is an end tag without any subtags, the processing proceeds to step 906; if not, the processing proceeds to step 909 (step 905). If the value of the tag at the current position is a specific symbol, the processing proceeds to step 908; if not, the processing proceeds to step 909 (step 906). All names and values of tags that are unreferenced among tags in the subject document are written in the business document 111 to be restored (step 907). The name and value of the tag in the subject document found in step 903 are written in the business document 111 to be restored (step 908). The name and value of the tag at the current position are written in the business document 111 to be restored (step 909).

Figure 10:
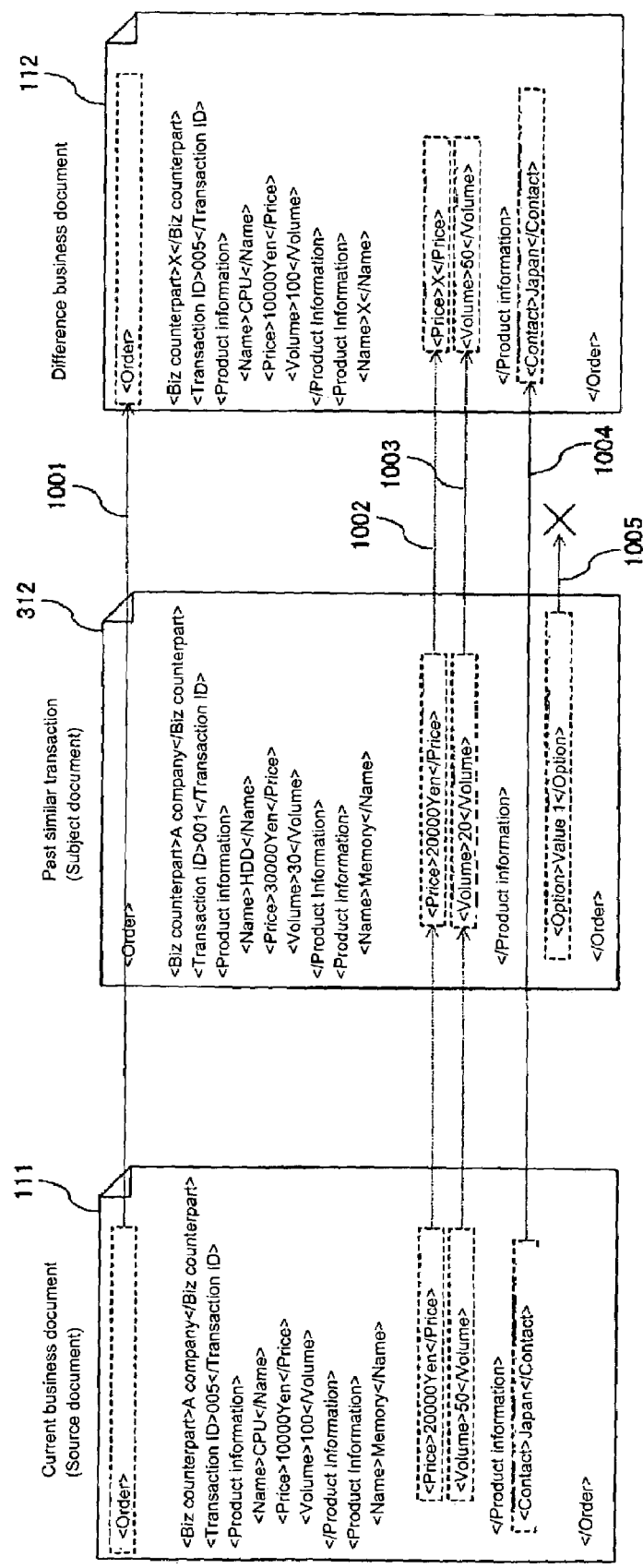
FIG. 10 shows a method to create a difference business document by comparing a similar transaction to an outgoing business document.

FIG. 10 indicates the flow of data when the original document in creating a difference for an outgoing business document (step 404 in FIG. 4 and FIG. 8) is the newly outgoing business document 111.

When a tag of the original document is not an end tag, the tag is written unaltered in the difference business document 112 (arrow 1001). When a tag of the original document is an end tag and its value matches the value of a tag of the subject document, a tag whose value has been replaced by a specific symbol is written in the difference business document 112 (arrow 1002). Here, the specific symbol is "X." When a tag of the original document is an end tag and its value does not match the value of a tag of the subject document, the name and value of the tag of the original document are written unaltered in the difference business document 112 (arrow 1003). When a tag of the original document is an end tag and its value does not match the value of a tag of the subject document (i.e., there is no value in the subject document), the name and value of the tag of the original document are written unaltered in the difference business document 112 (arrow 1004). When there is a tag in the subject document but not in the original document, the tag is ignored and therefore automatically omitted (arrow 1005).

Figure 11:
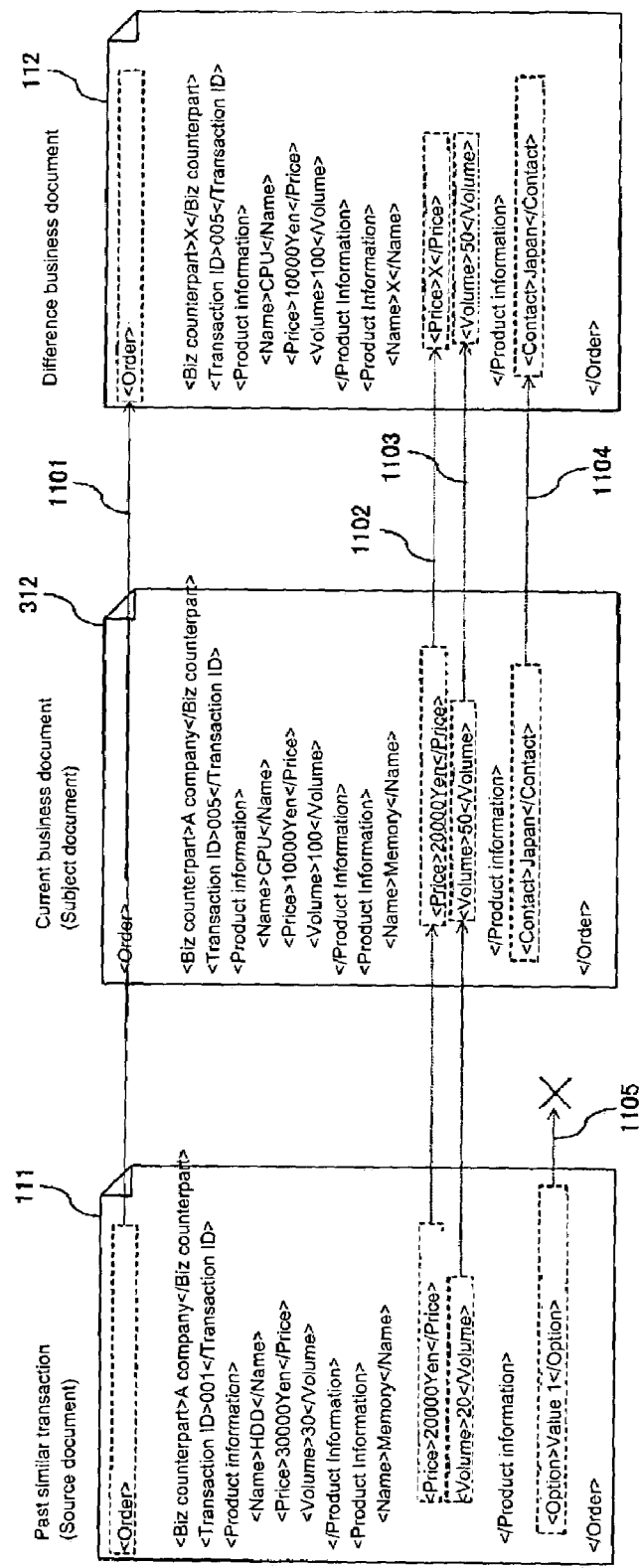
FIG. 11 shows a method to create a difference business document by comparing an outgoing business document to a similar transaction.

FIG. 11 indicates the flow of data when the original document in creating a difference for an outgoing business document (step 404 in FIG. 4 and FIG. 8) is the similar transaction 312.

When a tag of the original document is not an end tag, the tag is written unaltered in the difference business document 112 (arrow 1101). When a tag of the original document is an end tag and its value matches the value of a tag of the subject document, a tag whose value has been replaced by a specific symbol is written in the difference business document 112 (arrow 1102). Here, the specific symbol is "X." When a tag of the original document is an end tag and its value does not match the value of a tag of the subject document, the name and value of the tag of the subject document are written unaltered in the difference business document 112 (arrow 1103). When there is no tag in the original document but there is in the subject document, the name and value of the tag of the subject document are written in the difference business document 112 (arrow 1104). (This becomes written as an unreferenced tag in step 807). When there is a tag in the original document but not in the subject document, the tag is ignored (arrow 1005). (Since the processing in this case proceeds from step 804 to step 801, nothing is processed.)

Figure 12:
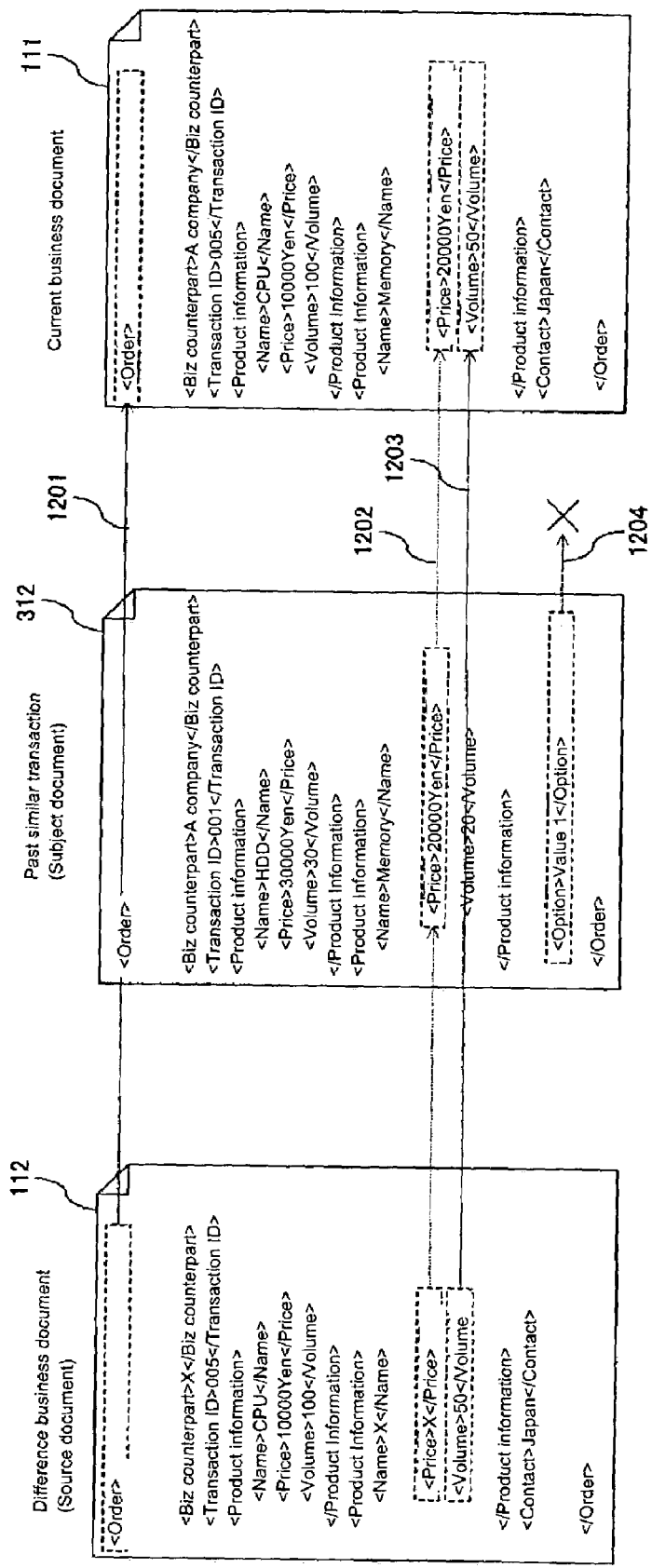
FIG. 12 shows a method to restore an original document from a similar transaction based on a difference business document received.

FIG. 12 indicates the flow of data when the original document in restoring a difference for an incoming business document (step 504 in FIG. 5 and FIG. 9) is the difference business document 112.

When a tag of the original document is not an end tag, the tag is written unaltered in the business document 111 to be restored (arrow 1201). When a tag of the original document is an end tag and its value is a specific symbol, the value of a tag with the same path information is obtained from the subject document, and the value obtained is written in the business document 111 to be restored (arrow 1202). When the value of a tag of the original document is not a specific symbol, its value is written in the business document 111 to be restored (arrow 1203). When there is a tag in the subject document but not in the original document, the tag is ignored (arrow 1204).

Figure 13:
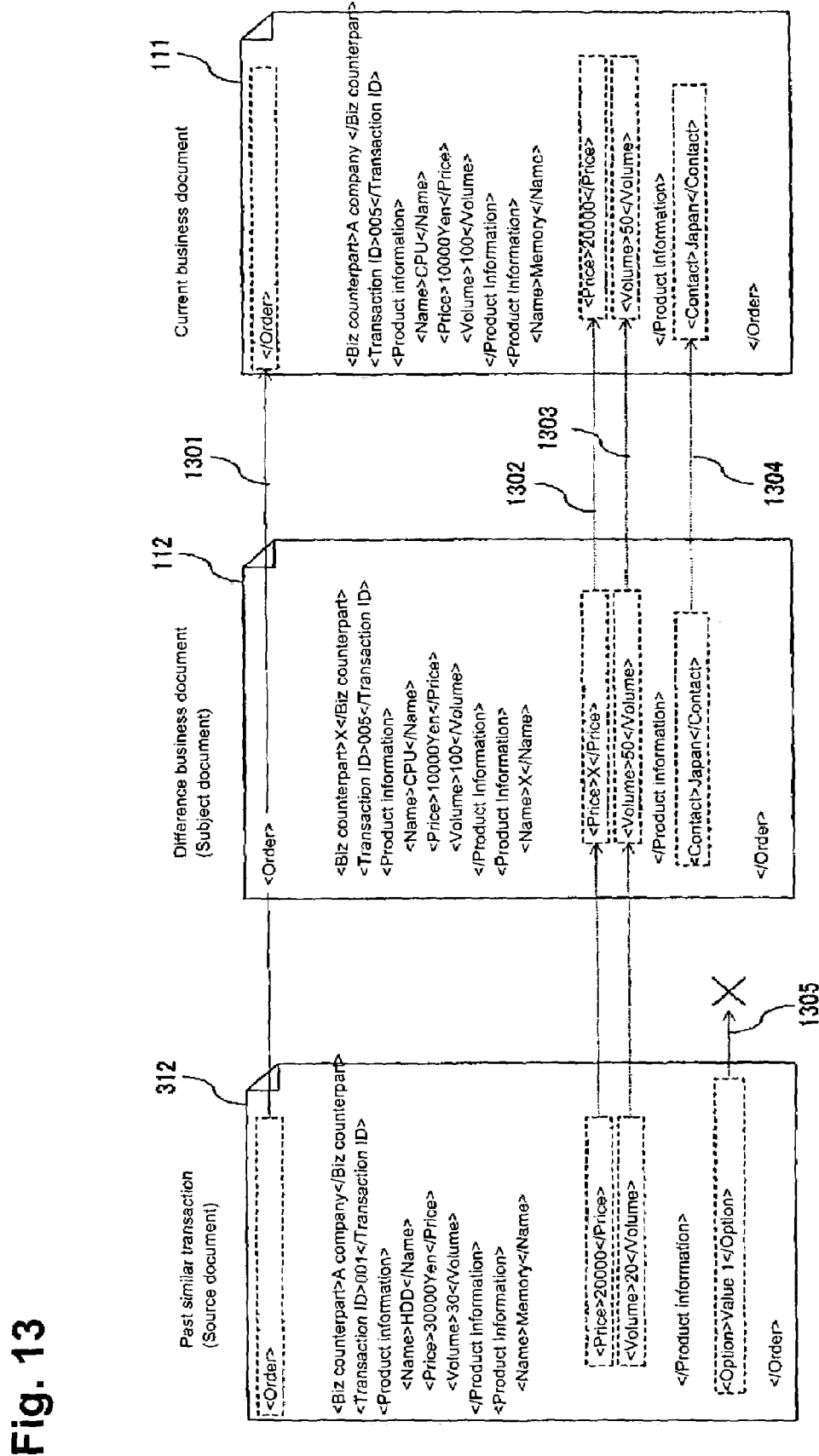
FIG. 13 shows a method to restore an original business document from a difference business document received based on a similar transaction.

FIG. 13 indicates the flow of data when the original document in restoring a difference for an incoming business document (step 504 in FIG. 5 and FIG. 9) is the similar transaction 312.

When a tag of the original document is not an end tag and there is a tag with the same path information in the subject document, the tag is written unaltered in the business document 111 to be restored (arrow 1301). When a tag in the original document is an end tag and the value of a tag with the same path information in the subject document is a specific symbol, the name and value of the tag of the original document are written in the business document 111 to be restored (arrow 1302). When a tag of the original document is an end tag and the value of a tag with the same path information in the subject document is not a specific symbol, the name and value of the tag of the subject document are written in the business document 111 to be restored (arrow 1303). When there is no tag in the original document but there is in the subject document, the name and value of the tag in the subject document are written in the business document 111 to be restored (arrow 1304). (The tag is written as an unreferenced tag in step 907.) When there is a tag in the original document but not in the subject document, the tag is ignored (arrow 1305). (Since the processing proceeds from step 904 to step 901, nothing is processed.)

The above describes one embodiment of the present invention using transaction history information.

Next, we will use drawings to describe an embodiment in which communication data amount is reduced by using templates exchanged in advance among business counterparts. In this embodiment, a template 1701 is used instead of the similar transaction 312, which was used in the embodiment that uses the history DB. FIG. 17 indicates an example of a template. Each template 1701 is a business document 111, as well as a template in which tags whose values are the same in every transaction have values set in advance.

In the following description, only differences from the embodiment in which the history DB is used are described. First, in the configuration of the system according to the present embodiment, the history DB 107 in FIG. 1 is replaced by a template management DB 1605.

Next, in the flow of data according to the present embodiment, the similar transaction 312 in FIG. 3 is replaced by the template 1701, while the similar transaction ID 313 is replaced by a template ID 1603.

Next, in flowcharts for incoming and outgoing business documents, step 403 in FIG. 4 for outgoing business documents is replaced by the following: "Is there a template 1701 in which the combination of a business counterpart identifier 1601 and a document structure definition 1602 matches a business document 111?" In this case, the template 1701 in which the business counterpart identifier 1601 and the document structure definition 1602 match the business document 111 is obtained from the template management DB 1605. In the above step 403, for example, the business counterpart identifier 1601 is an identifier for a business counterpart and the document structure definition 1602 is a format of the document to be followed for the corresponding transaction.

Further, step 404 is replaced by the following: "A difference business document 112 is created based on the new business document 111 and the template 1701." The method for creating a difference is the same as the method that uses the history DB. However, the similar transaction 312 is replaced by the template 1701. In addition, tags in the template 1701 whose values are not set are treated as though they do not exist.

For incoming business documents, step 503 in FIG. 5 is replaced by the following: "The template 1701 is obtained from the template management DB 1605." The template 1701 is obtained by using the template ID 1603 contained in a BtoB standard message 113 received or by using the business counterpart identifier 1601 and the document structure definition 1602 of the business document.

Step 504 is replaced by the following: "The new business document 111 is restored based on the difference business document 112 and the template 1701." The method for restoring a difference is the same as the method that uses the history DB. However, the similar transaction 312 is replaced by the template 1701. In addition, tags in the template 1701 whose values are not set are deemed to not exist.

FIG. 16 shows the details of the template management DB 1605 according to the present embodiment in which templates are used.

Each business counterpart identifier 1601 is an identifier for a business counterpart. Each document structure definition 1602 is a format of the document to be followed for the corresponding transaction. The document structure definition 1602 can be a DTD filename, for example. Each template identifier 1603 is an identifier for a template. The template identifier 1603 can be a filename, for example. An exchange flag 1604 is used in an embodiment described later, in which templates are exchanged during the first transaction, and indicates whether the template 1701 has already been exchanged with the business counterpart.

The above describes the embodiment in which templates are used and are exchanged in advance with business counterparts.

Next, a description is made as to an embodiment in which templates are used and are exchanged during the first transaction with a business counterpart. In this description, only differences from the embodiment in which templates are exchanged in advance with business counterparts are described.

The configuration of the system according to the present embodiment is the same as the embodiment in which the templates 1701 are exchanged in advance. However, an exchange flag 1604, which is a column in a template management DB 1605, can be used to check whether a corresponding template 1701 has already been exchanged.

For an outgoing business document, when the template 1701 has already been exchanged with the business counterpart the operation that takes place is the same as in the embodiment in which the templates are exchanged in advance. When the template 1701 has not been exchanged with the business counterpart, a difference business document 112 that contains a template 1701 is created and the exchange flag 1604 is set. In this case, the template 1701 is an XML schema file that includes default values for specific items, and the XML schema filename is indicated by a template identifier 1603.

For an incoming business document, an XML schema is designated in the difference business document 112, which means that the value of each item is automatically replaced by a default value in the XML schema, and there is no need to restore difference. However, in the first transaction with a new business counterpart, the XML schema file contained in the difference business document 112 must be extracted, the XML schema file stored in a specified storage position, the positional information stored in the template identifier 1603 of the template management DB 1605, and the exchange flag 1604 set.

The above describes the embodiment in which templates are used and are exchanged during the first transaction with each business counterpart.

As described above, by providing a difference processing section between an existing message exchange section and a task processing section, transactions with an indefinite number of business counterparts using a single electronic commerce system becomes possible, while reducing transaction data amount in transactions with a business counterpart who also utilizes the system according to the present invention.

As a result, the amount of processing for encryption and decryption are reduced, and the amount of transaction can be increased by that much. Further, the convenience of the Internet is enhanced and the Internet transaction users will increase in number. Moreover, different business document exchange methods can be used for different business counterparts, i.e., difference business documents that contain little extraneous information can be used in transactions with business counterparts with whom one does business frequently, and normal business documents can be used in transactions with other business counterparts.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for reducing the amount of data to be exchanged in a business to business electronic commerce system that exchanges documents between at least two computers connected via a communication network, the method comprising the steps of:

at a source computer, retrieving from a counterpart management database in the source computer a counterpart identifier to check whether a destination computer is capable of receiving a difference document;

at the source computer, retrieving from a transmission history database a transmitted source document that is similar to the document, and has been transmitted to the destination computer;

generating the difference document between the document and the transmitted source document;

transmitting the difference document from the source computer to the destination computer;

at the destination computer, retrieving from a reception history database a received source document that is a basis of the difference document received from the source computer; and restoring the document from the received source document and the difference document;

the method further comprising: switching between transmitting the difference document and transmitting the document depending on whether the destination computer is capable of processing difference documents, wherein the difference document is transmitted from the source computer to the destination computer only when the destination computer is capable of processing difference documents, and the document is transmitted from the source computer to the destination computer when the destination computer is disabled to process difference documents, and wherein the destination computer conforms to business-to-business standard specifications.

2. A method according to claim 1, further comprising the steps of:

transmitting to the destination computer a transmission message including a transaction identifier indicative of the transmitted source document that is a basis of the difference document; and retrieving the received source document at the destination computer based on the transaction identifier.

3. A method according to claim 1, wherein, upon generating the difference document, when the document and the transmitted source document have data items that can be abbreviated within a range of a predetermined message format whose values are identical with each other, the data item in the document is abbreviated in the difference document, and upon restoring the document, the data item that has been abbreviated is obtained from the received source document to restore the document.

4. A method according to claim 1, wherein, upon generating the difference document, when the document and the transmitted source document have data items whose values are identical with each other, the data item in the document is replaced with a predetermined value that reduces the data amount and the predetermined value is entered in the difference document, and upon restoring the document, the data item corresponding to the predetermined value is retrieved from the received source document and the predetermined value is replaced with the retrieved data item to restore the document.

5. A method for reducing the amount of data to be exchanged in a business to business electronic commerce system that exchanges documents between at least two computers connected via a communication network, the method comprising the steps of:

at a source computer, retrieving from a counterpart management database in the source computer a counterpart identifier to check whether a destination computer is capable of receiving a difference document;

at the source computer, specifying a template for generating a difference with the document based on an attribute of the document;

generating the difference document between the template and the document;

transmitting the difference document from the source computer to a destination computer;

at the destination computer, specifying a template that is a basis of the difference document received from the source computer; and restoring the document from the template and the difference document;

the method further comprising switching between transmitting the difference document and transmitting the document depending on whether the destination computer is capable of processing difference documents, wherein the difference document is transmitted from the source computer to the destination computer only when the destination computer is capable of processing difference documents.

6. A method according to claim 5, wherein, upon generating the difference document, when the document and the transmitted source document have data items that can be abbreviated within a range of a predetermined message format whose values are identical with each other, the data item in the document to be transmitted is abbreviated in the difference document, and upon restoring the document, the data item that has been abbreviated is obtained from the received source document to restore the document.

7. A method according to claim 5, wherein, upon generating the difference document, when the document and the transmitted source document have data items whose values are identical with each other, the data item in the document is replaced with a predetermined value that reduces the data amount and the predetermined value is entered in the difference document, and upon restoring the document, the data item corresponding to the predetermined value is retrieved from the received source document and the predetermined value is replaced with the retrieved data item to restore the document.

8. A method according to claim 5, wherein the template used in either generating the difference document or restoring the document is exchanged between the at least two computers prior to exchanging documents between the at least two computers.

9. A method according to claim 5, wherein the template is sent to the destination computer, and the templates is used for generating difference documents and restoring documents until a new template is sent to the destination computer.

10. A method according to claim 5, wherein the template is added to a transmission message, the transmission message is sent to the destination computer, and the templates is used for generating difference documents and restoring documents until a new template is sent to the destination computer.

11. A method according to claim 5, wherein the template that is a basis of the difference document received from the source computer is retrieved from among templates corresponding to the source computer in a template management database.

12. A method according to claim 5, wherein the template that is a basis of the difference document received from the source computer is retrieved from among templates corresponding to the source computer and business in a template management database.

13. A method according to claim 5, wherein the template that is a basis of the difference document received from the source computer is retrieved from among templates corresponding to the source computer in a template management database, which are similar to the document in transaction contents.

14. A method according to claim 5, wherein an identifier for specifying the template is designated in a user's extension field in a predetermined message format, and the identifier is used to specify the template that is a basis of the difference document received from the source computer.

15. A method according to claim 5, wherein an identifier for specifying the template is designated in the difference document, and the identifier is used to specify the template that is a basis of the difference document received from the source computer.

16. A method for reducing the amount of data to be exchanged in a business to business electronic commerce system that exchanges documents between at least two computers connected via a communication network, the method comprising the steps of:

retrieving from a transmission history database a transmitted source document that is similar to a document to be transmitted from a source computer to a destination computer, and that has been transmitted to the destination computer;

retrieving from a counterpart management database in the source computer a counterpart identifier to check whether the destination computer is capable of receiving a difference document from the source computer;

generating the difference document between the document and the transmitted source document; and transmitting the difference document to the destination computer;

switching between transmitting the difference document and transmitting the document depending on whether the destination computer is capable of processing difference documents, wherein the difference document is transmitted from the source computer to the destination computer only when the destination computer is capable of processing difference documents.

17. A method according to claim 16, further comprising the steps of:

receiving the difference document from the source computer;

retrieving from a reception history database a received source document that is a basis of the difference document received from the source computer; and restoring the document from the received source document and the difference document.

* * * * *